United States Patent [19]

Lorenz et al.

[11] 4,135,731
[45] Jan. 23, 1979

[54] UPPER LINK STORAGE CLIP

[75] Inventors: Leo J. Lorenz, Farmington; Auguste Asztalos, Plymouth, both of Mich.

[73] Assignee: Massey-Ferguson Inc., Detroit, Mich.

[21] Appl. No.: 816,833

[22] Filed: Jul. 18, 1977

[51] Int. Cl.² .............................................. B60D 1/00
[52] U.S. Cl. ................................ 280/461 A; 172/439; 280/497
[58] Field of Search .......... 280/461 A, 456 A, 460 A, 280/482, 491 R, 491 B, 491 D, 497; 172/439, 446; 74/532

[56] References Cited

U.S. PATENT DOCUMENTS 3,053,552  9/1962  Horney .............................. 280/482 X

FOREIGN PATENT DOCUMENTS 2310234  3/1976  France ................................ 280/491 B
223483  11/1968  U.S.S.R. .............................. 280/461 A Primary Examiner—John A. Pekar
Attorney, Agent, or Firm—John C. Thompson

[57] ABSTRACT

An upper link storage clip for securely maintaining the upper link of a tractor three-point hitch in its storage position without side to side movement, the storage clip being so designed that the upper link can be readily placed within it by a one hand operation. The upper link storage clip utilizes a spring biased pivoted hook to maintain the upper link between a pair of rearwardly extending spaced apart arms when the upper link is in its storage position. The rearward surface of the pivoted hook is provided with a cam surface so that as the upper link is forwardly swung towards its storage position the pivoted hook will be cammed to an open position permitting the introduction of the upper link between the pair of arms, the spring causing the pivoted hook to swing to its closed operative position when the upper link attains its storage position.

4 Claims, 3 Drawing Figures

UPPER LINK STORAGE CLIP

TECHNICAL FIELD

The present invention relates generally to farm machinery, and more specifically to means to securely hold the upper link of a tractor three-point hitch.

BACKGROUND ART

Many differing devices have been utilized to maintain the upper link of a three-point hitch in its transport or storage position. Thus, in one line of tractors a chain is passed behind the top link and is utilized to secure it in place. In another line of tractors a link is employed, one end of the link being secured to the tractor and the other end being secured to the upper link. Hooks of various shapes formed from wire stock have been employed, one being in a S shape, and another being in a hairpin shape.

As a general rule the aforementioned devices, as well as others known to the art, have three common disadvantages, although not all of these devices have all three disadvantages. These disadvantages are that the upper link may be able to swing from side to side when in its transport position. A second disadvantage is that the upper link may not be rigidly secured in its transport position and could be dislodged. A third disadvantage is that it is sometimes somewhat difficult to secure the upper link into its transport position.

SUMMARY OF THE INVENTION

It is a feature of this invention to provide an upper link storage clip which securely holds the upper link in its transport or storage position without side to side movement, the storage clip being so designed that the upper link can be readily placed within it with a one hand operation.

Other features of this invention will be apparent to those skilled in the art after a consideration of the following detailed description taken in conjunction with the accompanying drawings in which a preferred form of this invention is illustrated.

DETAILED DESCRIPTION

Figure 1:
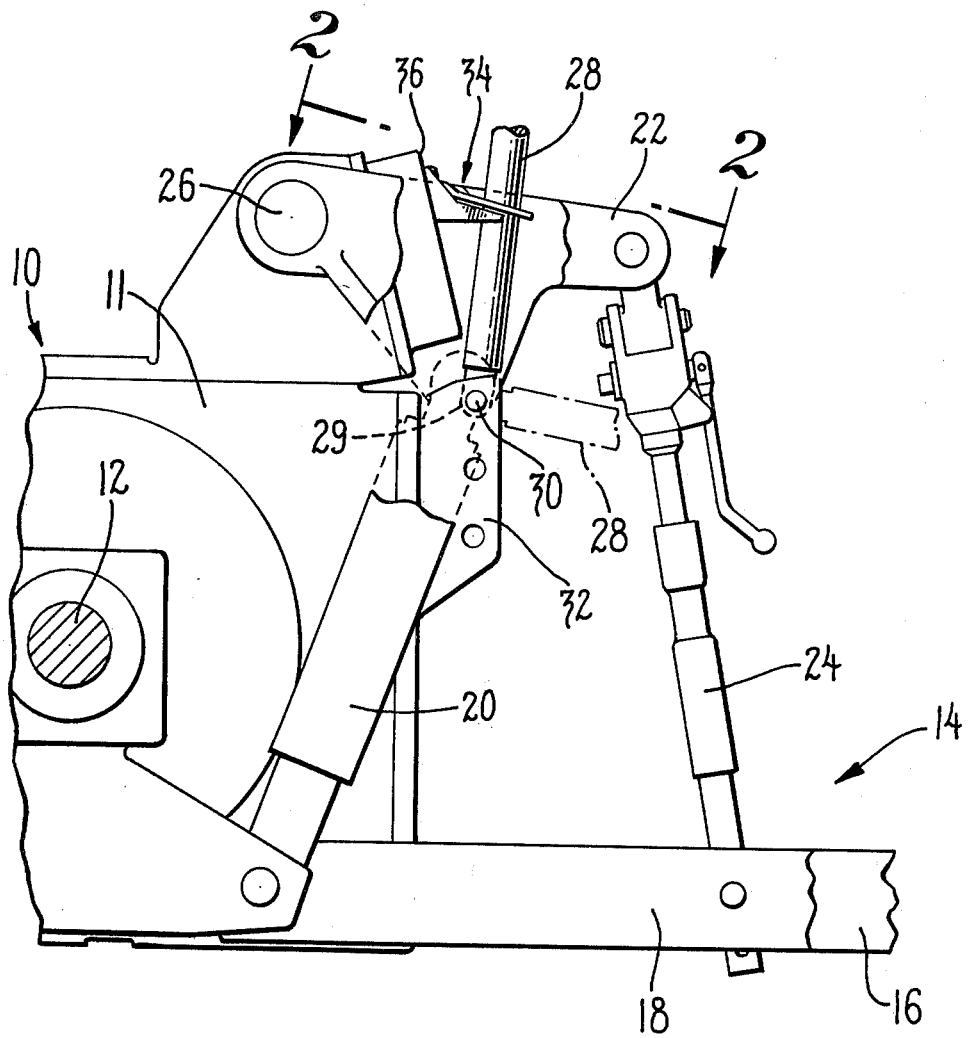
FIG. 1 is a side view of the rear portion of a three-point hitch tractor provided with the storage clip of this invention.

Referring first to FIG. 1, a portion of a tractor 10 is illustrated, the tractor 10 being provided with a body 11 having an axle 12 to which rear wheels may be secured. To the rear of the axle 12 is a hitch of the type generally referred to as a three-point hitch, the hitch being indicated generally at 14. As is conventional in the art, the hitch includes right and left lower draft links 16 and 18 the forward ends of which are secured to the tractor for swinging movement about a generally transversely extending axis. The rear end portion of the lower draft links may be raised and lowered by means of one or two lift cylinders 20 acting through rock arms 22 and lift links 24 in a manner well known in the art. Thus, rock arm 22 will rock about shaft 26 causing lift link 24 and the associated draft link to be raised when the cylinder 20 is extended.

The three-point hitch will also include an upper or compression link 28 (only the forward portion of which is illustrated) the forward end 29 of the link 28 being secured by pivot pin means 30 to spaced apart rearwardly extending ears 32, which are rigidly secured to a rear portion of the tractor body. The illustrated embodiment of the invention is designed to work with an upper link having a generally cylindrical cross section. However, it should be apparent that other embodiments of the invention may be designed for upper links having other cross sectional designs.

Figure 2:
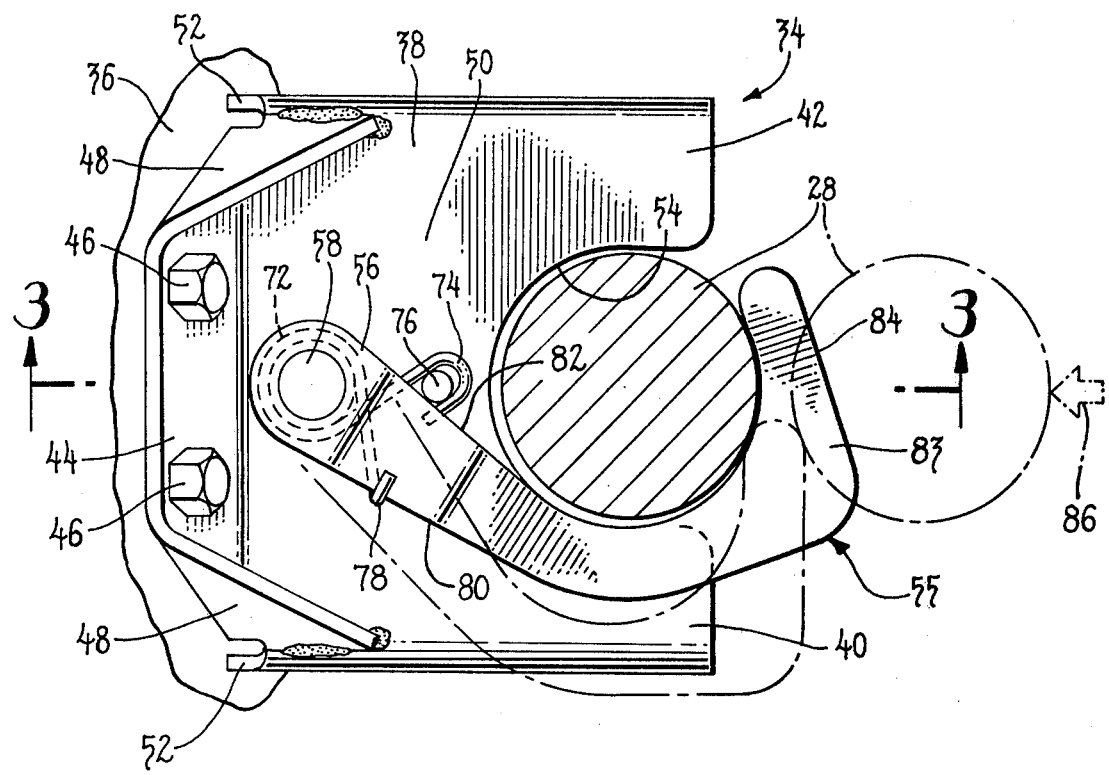
FIG. 2 is an enlarged view taken generally along the line 2—2 in FIG. 1.
Figure 3:
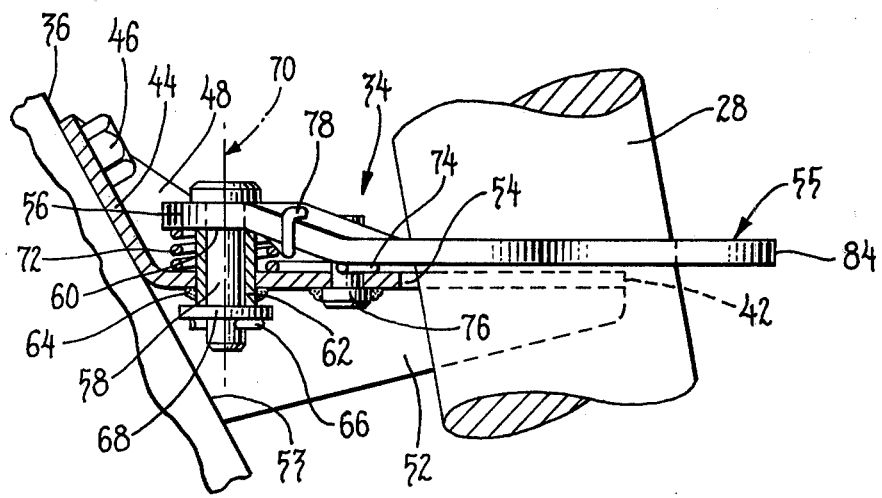
FIG. 3 is a sectional view taken generally along the line 3—3 in FIG. 2.

According to the principles of this invention an upper link storage clip, indicated generally at 34, is mounted on an upper rear portion 36 of the tractor body 11 above the ears 32. As can best be seen from FIGS. 2 and 3, the upper link storage clip 34 includes a sheet metal structure 38 having a pair of rearwardly extending spaced apart arms 40, 42. The forward portion 44 of the structure 38 is bent upwardly and is secured to the rear portion 36 by means of bolts 46 or other suitable fasteners. Reinforcing portions 48 extend backwardly from the sides of the forward portion 44 and serve to reinforce the main body portion 50 of the sheet metal structure with respect to the forward portion 44. In practice, the reinforcing portions are integral with the forward portion and are bent back after the forward portion has been bent up, the lower marginal edge of the reinforcing portion then being welded to the main body portion 50 of the sheet metal structure 38. In order to give greater rigidity to the main body portion 50 its side edge portions 52 are bent downwardly, the forward edge 53 of each side edge portion 52 abutting the rear surface of the upper rear portion 36.

The spaced apart arms 40, 42 and the main body portion 50 define a generally circular recess or cut out 54 which is adapted to receive the upper link 28. The upper link 28 is held within the recess by a hook indicated generally at 55. The forward end 56 of the hook 55 has a pivot pin 58 rigidly secured thereto, the pivot pin 58 passing through a bushing secured within an aperture in the main body portion 50 of the sheet metal structure 38, the lower surface 60 of the forward end 56 riding on top of the bushing 62, the bushing being welded at 64 to the sheet metal structure 38. A cotter pin 66 passes through an aperture in the lower end of the pivot pin 58 and a washer 68 is disposed between the cotter pin 66 and the lower end of the bushing 62. When the parts are assembled in the manner best illustrated in FIG. 3 it can be seen that the hook 55 will be adapted to rotate about the axis of 70 of the pivot pin 58 but will be restrained from vertical movement.

A spring 72 is disposed about the bushing 62 and has one end 74 disposed about a pin 76 welded to the structure 38, the other end 78 of the spring 72 engaging the outer surface 80 of the hook 55. The spring 72 will bias the hook 55 to its normal operating position shown in full lines in FIG. 2 wherein the inner surface 82 will contact the pin 76. When the hook 55 is in its normal operative position its rearward portion 83 will securely maintain the upper link 28 in its transport position. However, if the upper link has not been stored between the arms 40, 42 it can readily be moved to its storage or transport position. Thus, when the hook is in its normal operating position, its rear marginal surface 84 (or cam surface) is disposed at an angle to the direction of swinging movement of the upper link 28. Therefore, when the upper link is swung in the direction indicated by the arrow 86 from its normal operating position to its storage or transport position its leading surface will contact surface 84 and cause hook 55 to be cammed away from its normal closed position through an intermediate position, indicated by broken lines in FIG. 2, to a fully open position wherein the upper link 28 may pass between the arms 40,42. When the upper link has been moved into this position the spring 72 will then cause the hook to close to securely maintain the link in this position. To move the upper link 28 from the transport position to its operative position it is then only necessary for the operator to swing the hook 55 to its full open position between the arms 40,42.

It should be appreciated from the above that the upper link storage clip of this invention will maintain the upper link from excessive side to side movement, will permit the placing of the upper link into the storage position, and will then firmly hold the upper link in its transport position.

While a preferred structure in which the principles of the present invention have been incorporated has been shown and described above, it is to be understood that the invention is not to be limited to the particular details shown and described above, but that, in fact, widely differing means may be employed in the practice of the broader aspects of the invention.

We claim:

1. An upper link storage clip in combination with a tractor having a pair of rearwardly extending lower draft links and an upper link the forward end of which is secured to a rear portion of the tractor for movement relative thereto between operative and storage positions, characterized in that the upper link storage clip includes:

structure including a pair of rearwardly extending spaced apart arms, a forward portion of the structure being secured to a rear portion of the tractor;

a hook pivotally interconnected with said structure and movable between an open position and a closed normal operating position wherein a portion of the hook extends between the ends of the spaced apart arms, said portion being capable of maintaining the upper link in a storage position between the arms and being provided with a rear cam surface engageable by the upper link when the upper link is moved from its operative position to its storage position, the hook being cammed open against spring bias to permit the upper link to be moved into the storage position; and a spring operable to bias the hook to its closed normal operating position.

2. The upper link storage clip set forth in claim 1 wherein the structure is an integral sheet metal member having a main body portion and an upwardly and forwardly extending portion which is secured to the rear portion of the tractor and wherein the rearwardly extending arms lie in the same plane as the main body portion.

3. The upper link storage clip set forth in claim 2 wherein the forward portion of the hook is pivotally interconnected with the main body portion of the sheet metal structure at a location between and forward of the rearwardly extending arms.

4. The upper link storage clip set forth in claim 3 wherein the hook is pivotally secured to the main body portion by a pivot pin carried by the forward end of the hook, the pivot pin passing through a bushing carried by the main body portion and wherein a washer is mounted about the pivot pin and is engageable with the one end of the bushing, a surface of the hook engaging the other end of the bushing.

* * * * *